May 17, 1932. E. A. PUTNAM 1,858,458
ENGINE EXHAUST
Filed July 31, 1929

Inventor
Ernest A. Putnam
By Clarence A. O'Brien
Attorney

Patented May 17, 1932

1,858,458

UNITED STATES PATENT OFFICE

ERNEST A. PUTNAM, OF IOWA CITY, IOWA

ENGINE EXHAUST

Application filed July 31, 1929. Serial No. 382,361.

The present invention appertains to internal combustion engines and more particularly to a novel exhaust whereby the heat of the exhaust gases may be quickly dissipated.

The principal object of the invention is to provide means whereby the exhaust valves and manifold of an internal combustion engine may be cooled by air.

A further important object of the invention is to provide an exhaust valve construction for an internal combustion engine such that the stems and guides of the exhaust valves may be lubricated without carbonizing and baking of the lubricant between the stems and valves. By this construction, the stems and guides of the exhaust valves may be oiled without sticking of these valves.

Other important objects and advantages of the invention will become apparent as the invention is better understood from the following specification and claims.

Figure 1:
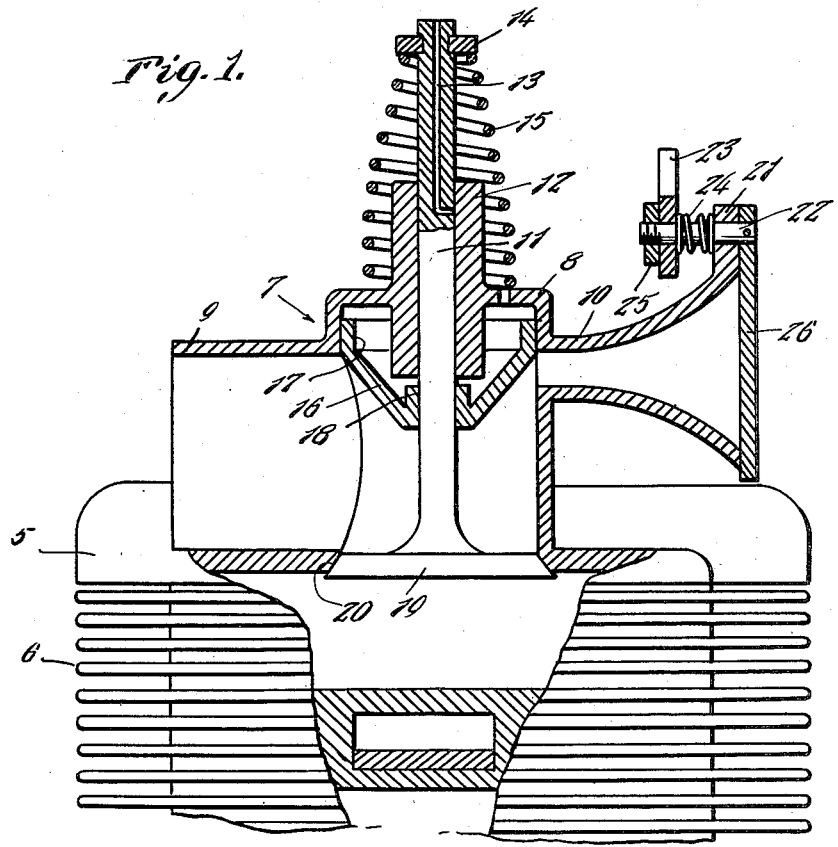
Figure 1 represents a fragmentary partial vertical sectional view of an engine cylinder equipped with the improved exhaust.

Referring to the drawings, wherein like numerals designate like parts, the numeral 5 designates a cylinder of conventional construction and provided with the usual cooling fins 6. Mounted upon the cylinder 5 is an exhaust valve shell which is generally referred to by numeral 7 and which includes a vertically disposed cylindrical wall portion forming a chamber 8 and an exhaust pipe section 9 leading therefrom.

A conical shaped inlet 10 is secured by its reduced end to the opposite side of the chamber 8 and has communication therewith at its upper portion, as is clearly shown in Figure 1. The usual valve stem 11 is vertically slidable through the guide 12. The valve stem 11 has a lubricant duct 13 extending downwardly from the upper end of the stem and opening through the side of the stem within the guide 12. A member 14 is provided at the upper end of the valve stem against which one edge of the exhaust valve spring 15 impinges.

Figure 2:
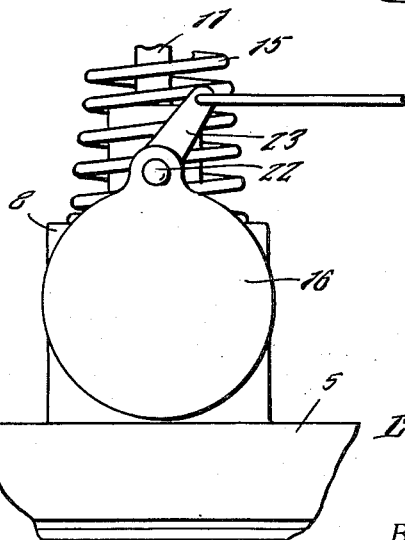
Figure 2 represents a fragmentary side elevation of the improved exhaust.

An inverted conical shaped shell 16 is provided with a cylindrical upper wall or skirt 17, while its lower apex portion merges into a collar 18 for attachment to the stem 11, so that the conical shell and its upper cylindrical wall will move with the valve stem. Obviously shell 16 may be integral with stem 11 if desired. The valve stem is provided with the usual valve seat portion 19 at its lower end seatable against the face 20 of the exhaust valve opening. As shown in Figure 1, shell 16 with its skirt 17 does not merely provide a shield for the guide 12, but also forms a means substantially preventing the exhaust gases from reaching and contacting with the guide. The outer end of the conical inlet 10 is provided with an upstanding boss 21, through which a pin 22 is rotatably disposed. A bell crank 23 is provided on the pin 22 while a spring 24 is interposed between the boss 21 and the bell crank 23 for tensionally urging the latter against the nut 25 of the pin 22. The opposite end of the pin from the nut 25 is secured to a discular cover plate 26 for selective disposition over the open flared end of the inlet 10. As indicated in Figure 2, bell crank 23 may have means connected thereto for actuation of plate 26 from a distance as from the dash of an automobile.

Let it be assumed that plate 26 is in the open position, that is, in such position as to leave the flared end of inlet 10 open. It will be seen that when the valve 19 is unseated, the descended position of the shell 16 will have its cylindrical wall 17 obstructing the inner end of the inlet 10, thus precluding any air from entering the exhaust manifold. However, when the valve 19 again becomes seated, the displacement of the cylindrical wall 17 from the inner end of the inlet 10 will permit cold air to sweep into the exhaust manifold and thoroughly cool the exhaust valve and manifold. It is preferable that the inlet 10 have its flared end disposed toward the propeller of an aeroplane or the cooling fan of an automobile, so that it will obtain a full blast of air. Of course air under predetermined controlled pressure may be supplied to inlet 10.

Obviously many changes may be made in the specific shape, size and materials in the construction of this novel exhaust without departing from the spirit or scope of this invention as claimed hereinafter.

Having described the invention, what is claimed as new is:

1. In combination with an internal combustion engine having an exhaust valve opening and an exhaust pipe section communicating therewith, an exhaust valve comprising a valve seat portion adapted to close said opening, a stem extending from said valve seat portion into said pipe section and slidable in a guide, and means for preventing the exhaust gases from coming into contact with said guide, said means being disposed about said stem and between said valve seat portion and said guide.

2. In combination with an internal combustion engine having an exhaust valve opening and an exhaust pipe section communicating therewith, said pipe section having a cylindrical wall portion, an exhaust valve comprising a valve seat portion adapted to close said opening, a stem extending from said valve seat portion into said pipe section and slidable in a guide, said guide being within and spaced from said cylindrical wall portion and means for protecting said guide from the direct heat of the exhaust gases, said means including a substantially conical shell fixed to said stem between said valve seat portion and said guide and being slidably associated with said cylindrical wall portion of said exhaust pipe section, whereby the exhaust gases are substantially prevented from contacting with said guide.

3. In combination with an internal combustion engine having an exhaust valve opening and an exhaust pipe section communicating therewith, an exhaust valve comprising a valve seat portion adapted to close said opening, a stem extending from said valve seat portion into said pipe section and slidable in a guide, and means for protecting said guide from the direct heat of the exhaust gases, said means including a substantially conical shell fixed to said stem between said valve seat portion and said guide and provided with a skirt at the base of said conical shell, and said skirts being slidably associated with said exhaust pipe section to prevent the exhaust gases from coming into contact with said guide.

4. In an internal combustion engine having an exhaust valve opening and an exhaust pipe section communicating therewith, the combination of an exhaust valve having a valve seat portion adapted to close said opening and a stem extending from said valve seat portion into said pipe section, an air inlet in said pipe section near said stem, and means adapted to close said inlet only when said valve seat portion is in its open position, said means being movable in coordination with said exhaust valve.

5. In an internal combustion engine having an exhaust valve opening and an exhaust pipe section communicating therewith, the combination of an exhaust valve having a valve seat portion adapted to close said opening and a stem extending from said valve seat portion into said pipe section, an air inlet in said pipe section near said stem, and means fixed to said stem and adapted to close said inlet when said valve seat portion is in its open position.

6. In an internal combustion engine having an exhaust valve opening and an exhaust pipe section communicating therewith, the combination of an exhaust valve having a valve seat portion adapted to close said opening and a stem extending from said valve seat portion into said pipe section, an air inlet in said pipe section near said stem, and a substantially conical shell fixed to said stem and having a skirt adapted to close said inlet when said valve seat portion is in its open position.

7. In an internal combustion engine having an exhaust valve opening and an exhaust pipe section communicating therewith, the combination of an exhaust valve having a valve seat portion adapted to close said opening and a stem extending from said valve seat portion into said pipe section, said stem being slidable in a guide on said engine, a shell fixed to and around said stem and between said valve seat portion and said guide, and an air inlet in said pipe section, said shell being adapted to close said inlet when said valve seat portion is in its open position.

8. In an internal combustion engine having an exhaust valve opening and an exhaust pipe section communicating therewith, the combination of an exhaust valve having a valve seat portion adapted to close said opening and a stem extending from said valve seat portion into said pipe section, said stem being slidable in a guide on said engine, a shell fixed to and around said stem and between said valve seat portion and said guide, an air inlet in said pipe section, said shell being adapted to close said inlet when said valve seat portion is in its open position, and means on said inlet for selectively closing the same.

9. In an internal combustion engine having an exhaust valve opening, the combination of an exhaust valve having a valve seat portion adapted to close said opening and a stem extending from said valve seat portion, a shell fixed to and around said stem, an exhaust pipe section provided with a guide for said stem and with a wall portion having slidable contact with said shell, and an air inlet in said wall portion, said shell being adapted to close said inlet when said valve seat portion is in its open position.

10. In an internal combustion engine having an exhaust valve opening, the combination of a reciprocatable exhaust valve having a valve seat portion adapted to close said opening and a stem extending from said valve seat portion, a conical shell secured at its apex around said stem and having a cylindrical skirt, whereby said skirt is reciprocatable with said valve, an exhaust pipe section provided with a guide for said stem and with a wall portion conforming to and having sliding contact with said skirt, and an air inlet in said wall portion, said inlet being within the limits of the reciprocatory movement of said skirt.

11. An exhaust valve for an internal combustion engine having an exhaust pipe section provided with a valve stem guide and with a cylindrical wall portion spaced from and around said guide, said exhaust valve comprising a valve seat portion, a stem extending substantially perpendicularly from said seat portion, and a substantially conical shell around said stem, said shell being provided with means adapted to be slidably associated with said cylindrical wall portion.

12. An exhaust valve for an internal combustion engine having an exhaust pipe section provided with a valve stem guide and with a cylindrical wall portion spaced from and around said guide, said exhaust valve comprising a valve seat portion, a stem extending substantially perpendicularly from said seat portion, and a shell around said stem, said shell comprising a conical portion and a cylindrical skirt extending therefrom, and said skirt being adapted to be slidably associated with cylindrical wall portion.

13. An exhaust valve for an internal combustion engine having an exhaust pipe section provided with a valve stem guide and with a wall portion spaced from and about said guide, said exhaust valve comprising a valve seat portion, a stem extending from said seat portion, and means fixed to the intermediate portion of said stem and adapted to shield the free end of said stem from exhaust gases passing from said seat portion toward said stem, said means being adapted, when operatively associated with the engine, to have constant contact with said wall portion of the exhaust pipe section, and said contact extending uninterruptedly about said valve stem guide whereby the exhaust gases may be prevented from contacting with said valve stem guide.

In testimony whereof I affix my signature.

ERNEST A. PUTNAM.